United States Patent [19]

Crotty, III et al.

[11] Patent Number: 5,042,867

[45] Date of Patent: Aug. 27, 1991

[54] AUTOMOTIVE SUNSHADE INCLUDING AN EXTENDER

[75] Inventors: Willard E. Crotty, III, Coldwater; Richard D. Hood, Jonesville; Don M. Peterson, Quincy, all of Mich.

[73] Assignee: Crotty Corporation, Quincy, Mich.

[21] Appl. No.: 590,356

[22] Filed: Sep. 28, 1990

[51] Int. Cl.$^5$ .............................................. B60J 3/02
[52] U.S. Cl. ................................. 296/97.8; 296/97.11
[58] Field of Search .................... 296/97.1, 97.8, 97.11; 16/115, 121

[56] References Cited

U.S. PATENT DOCUMENTS

| D. 281,413 | 11/1985 | Body . | |
|---|---|---|---|
| 2,120,892 | 6/1938 | Francis | 296/97.8 X |
| 2,667,222 | 1/1954 | McCarthy et al. | 296/97.8 X |
| 3,008,757 | 11/1961 | Sinnett | 296/97.8 |
| 3,016,262 | 1/1962 | Hunt | 296/97.8 X |
| 3,375,364 | 3/1968 | Marcus | 240/QA |
| 4,690,451 | 9/1987 | Killar | 296/97.8 X |
| 4,925,232 | 5/1990 | Hemmeke et al. | 296/97.8 |

FOREIGN PATENT DOCUMENTS

| 2332613 | 1/1975 | Fed. Rep. of Germany | 296/97.8 |
|---|---|---|---|
| 2747206 | 4/1979 | Fed. Rep. of Germany | 296/97.8 |
| 1402144 | 5/1965 | France | 296/97.8 |
| 575011 | 3/1957 | Italy | 296/97.8 |
| 1504700 | 3/1978 | United Kingdom | 296/97.8 |

Primary Examiner—Margaret A. Focarino
Assistant Examiner—Joseph D. Pape
Attorney, Agent, or Firm—Jeffers, Hoffman & Niewyk

[57] ABSTRACT

A sunshade assembly, and method of manufacturing same, including an inner core board, a self-contained extender assembly mounted to the core board, and an outer covering. The extender assembly includes a plastic channel member attached to the core board by heat staking, and an extender blade slidingly received within the channel member between a retracted position and an extended position. The handle end of the extender blade extends through an access opening in the outer covering and includes a handle portion that, in the retracted position of the extender blade, wraps around and frictionally engages the peripheral edge of the outer covering, thereby making the handle visible and easily grasped from both sides of the sunshade assembly. The channel member includes upper and lower tracks between which the blade is slidingly retained. The tracks include fingers that are resiliently biased against the blade to provide friction.

20 Claims, 4 Drawing Sheets

AUTOMOTIVE SUNSHADE INCLUDING AN EXTENDER

BACKGROUND OF THE INVENTION

The present invention relates generally to sunshades for vehicles and, more particularly, to such a sunshade including a selectively retractable extender that may be used to increase the coverage area of the sunshade.

It is well known to provide a sunshade for the windshield of a vehicle, e.g., an automobile, wherein the sunshade is mounted on the vehicle body roof for movement between a storage position adjacent the vehicle headliner, a first use position adjacent the windshield, and a second use position adjacent a side door window opening.

In recent years, the trend in automobile design has been to move or angle the windshield forwardly of the passengers and to narrow the width of the vehicle. Consequently, a sunshade that is properly sized and mounted for use in its first use position adjacent the windshield may not extend far enough back when pivoted to its second use position adjacent the side door window. In order to maintain a proper sunshade size and still allow a passenger to selectively increase the coverage area of the sunshade to cover the side door window, sunshades having retractable extenders have been developed.

One prior art design for a sunshade having a retractable extender includes a one piece core that is molded of a plastic material in two integral half sections that fold upon themselves to form the one piece core. The half sections form a cavity or recess within the core, into which a separate extender blade is slidingly received through an access opening in one of the half sections. The access opening is located on the side of the sunshade that faces the interior of the vehicle when the sunshade is in its storage and second use positions.

In the aforementioned prior art sunshade design, the exposed edge of the extender blade includes an outwardly projecting handle portion that both facilitates engagement by the fingertips of a passenger and limits the extent of retraction of the extender blade into the recess. In its fully retracted position, the extender blade is visible and hence easily accessible from only one side of the sunshade, i.e., the extender blade is not visible to the passenger when the sunshade is in its first use position adjacent the windshield. Not only does this make the extender inconvenient to operate from all positions of the sunshade, but it also diminishes the perceived value that the extender would have if it were always visible to the consumer.

A further disadvantage of the aforementioned prior art sunshade design, wherein a molded one piece core is used, is that the manufacture of sunshades with and without extender assemblies requires different molds or molds having inserts or plugs. Also, a desired amount of sliding friction is achieved between the extender blade and the recess within the core by utilizing a resilient extender blade having a preformed curvature. The friction produced by this method may not be predictable, and the curvature in the extender blade may become visibly noticeable when the blade is fully extended.

The present invention is directed to overcoming the aforementioned problems associated with sunshades having retractable extenders, wherein it is desired to provide a sunshade assembly that is easily manufactured and operated, and one that has greater perceived value.

SUMMARY OF THE INVENTION

The present invention overcomes the problems and disadvantages of the above-described prior art sunshades having retractable extenders by providing a improved sunshade and extender assembly, wherein the handle portion of the extender blade is visible and readily accessible by the operator in any position of the sunshade. Furthermore, the extender assembly of the present invention is a self-contained unit that is easily manufactured and added on to a basic sunshade assembly.

In general, the invention provides a sunshade including an extender assembly having an extender blade slidingly received within the sunshade body. The extender blade slides through an access opening in the sunshade body adjacent a side edge of the sunshade, and includes a handle portion that wraps around the side edge of the sunshade when the extender blade is in its fully retracted position. Accordingly, the handle portion is visible from both sides of the sunshade and may be easily grasped between the thumb and forefingers.

More specifically, the invention provides, in one form thereof, a self-contained extender assembly that may be incorporated into a sunshade having a single-layer core design. The extender assembly includes a channel member that is mounted adjacent one side of an inner core board. A blade member is slidingly received within the channel member, and is slidable between a retracted position and an extended position. An outer covering covers the extender assembly and inner core board, and includes an access opening through which the blade member extends.

An advantage of the sunshade assembly of the present invention is that the handle portion of the extender blade is visible and readily accessible by an operator in any position of the sunshade.

Another advantage of the sunshade assembly of the present invention is that the sunshade assembly has enhanced perceived value by virtue of the extender handle being always visible to the operator.

A further advantage of the sunshade assembly of the present invention is that a self-contained extender assembly may be easily incorporated as an option into a sunshade assembly having a single-layer inner core design.

Yet another advantage of the sunshade assembly of the present invention is that the extender blade can experience frictional resistance against sliding without deformation of the extender blade.

A still further advantage of the sunshade assembly of the present invention is that a separate self-contained extender assembly is provided having a channel member that is easily manufactured by a simple molding process.

The invention, in one form thereof, provides a sunshade assembly including a retractable extender for selectively providing increased coverage area. The assembly comprises a generally planar inner core board having opposite sides and a periphery, and a separate extender channel member mounted adjacent one of the opposite sides. An extender blade having a handle portion is slidingly received within the extender channel member. The assembly also includes an outer covering for covering the inner core board and the extender channel member. The outer covering includes an outer peripheral edge extending around the periphery of the inner core board, and an access opening through which the extender blade extends. The handle portion of the extender blade is adapted to wrap around a portion of the outer peripheral edge of the outer covering. In one aspect of the invention of this form, the channel member comprises a flat body portion having an upper edge and a lower edge, an upper track along the upper edge, and a lower track along the lower edge. The blade member is slidingly retained between the upper track and the lower track on one side of the body portion.

The invention further provides, in one form thereof, a method of manufacturing a sunshade assembly having an extender that is selectively movable between a retracted position and an extended position to provide increased coverage area. The method includes first providing a generally planar inner core board having a first side, a second side, and a periphery, and an extender assembly including a channel member and an extender blade slidingly received within said channel member. The extender blade includes a captured end received within the channel member and an opposite free end that is out of engagement with the channel member. The free end includes a handle portion to enable an operator to selectively move the extender blade between the retracted position and the extended position of the extender. The method of the present invention further includes mounting the channel member to one of the inner core board, and then covering the inner core board and the extender assembly with a covering material that has an access opening through which the free end of the extender blade extends. In an aspect of the invention of this form, the inner core board may include a plurality of holes and the channel member may include a corresponding plurality of posts integrally formed therewith. According to this arrangement, the channel member is mounted to the side of the inner core board by placing the channel member adjacent the core board such that the posts extend through the holes to the other side of the core board. The posts are then heat staked on the other side of the core board so as to terminate in respective heat stakes that have greater diameter than the holes.

DESCRIPTION OF THE PREFERRED EMBODIMENT

Figure 1:
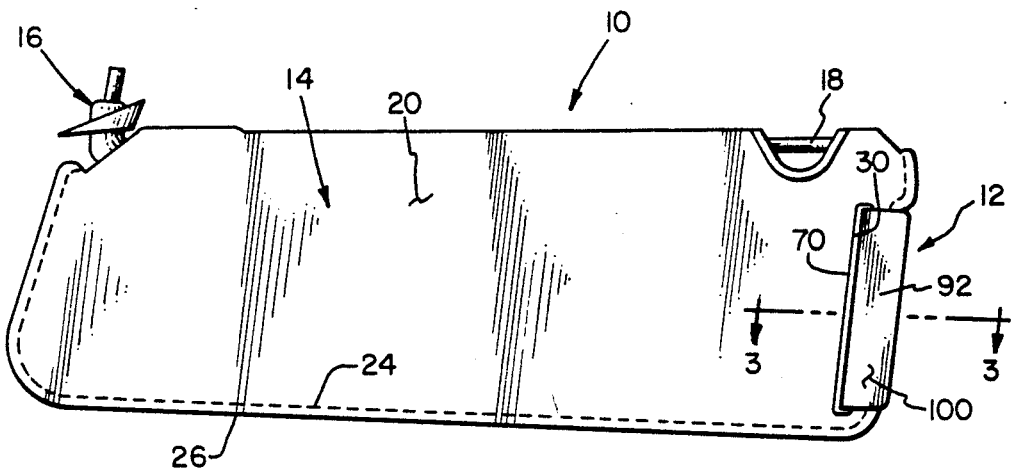
FIG. 1 is a front elevational view of a sunshade assembly incorporating an extender assembly in accordance with the present invention, particularly showing the extender blade in its fully retracted position.
Figure 2:
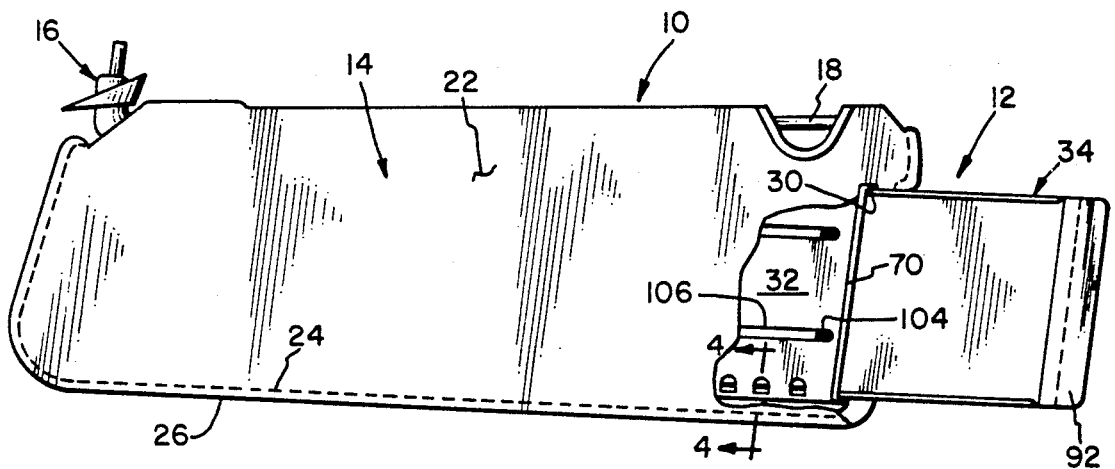
FIG. 2 is another front elevational view of the sunshade assembly of FIG. 1, particularly showing the extender blade in its fully extended position and showing a portion of the cloth covering cut away in order to expose the extender channel.

Referring now to the drawing, and in particular to FIGS. 1 and 2, there is shown a sunshade assembly 10 incorporating an extender assembly 12 in accordance with the present invention. Sunshade assembly 10 generally comprises a sunshade body 14 that is operably connected to a vehicle headliner (not shown) by means of a mounting bracket and arm assembly 16. With the aid of a supplemental hinge member 18, assembly 16 serves as a horizontal axis for rotation of the sunshade between a storage position and a first use position adjacent the front windshield. Upon disengagement of hinge member 18, assembly 16 also serves as a vertical axis for movement of the sunshade body to a second use position adjacent the side window.

Sunshade body 14 comprises a solid inner core board 20 of a pressed wood material, and an outer cloth covering 22 of a foam-backed cloth adhered to a kraft paper foundation. Referring to FIGS. 1-4, covering 22 is folded over core board 20 and is edge sewn along seam 24 to form a double-layered peripheral edge portion 26 circumjacent periphery 28 of core board 20. On one side of sunshade body 14, covering 22 is provided with an access opening 30 for extender assembly 12, which will now be described in more detail.

Figure 3:
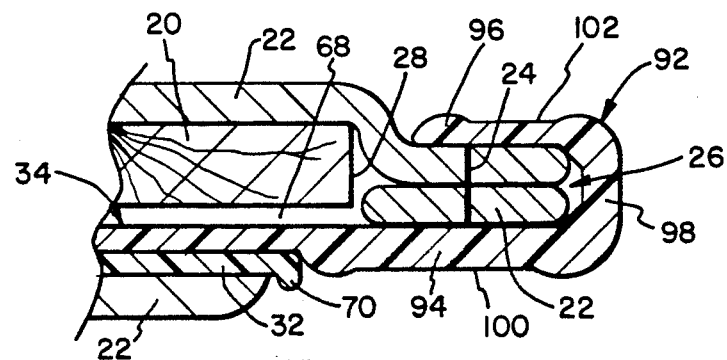
FIG. 3 is an enlarged fragmentary sectional view of the sunshade assembly of FIG. 1, taken along the line 3—3 in FIG. 1 and viewed in the direction of the arrows, particularly showing the handle portion of the extender blade engaging the peripheral edge of the sunshade body

Extender assembly 12 includes a channel member 32 mounted adjacent one side of core board 20, and an extender blade 34 slidingly received within channel member 32 and selectively positioned by an operator between a retracted position (FIG. 1) and an extended position (FIG. 2). As illustrated in FIGS. 2 and 3, channel member 32 is intermediate inner core board 20 and outer covering 22, and extender blade 34 passes through access opening 30 in covering 22.

Figure 5:
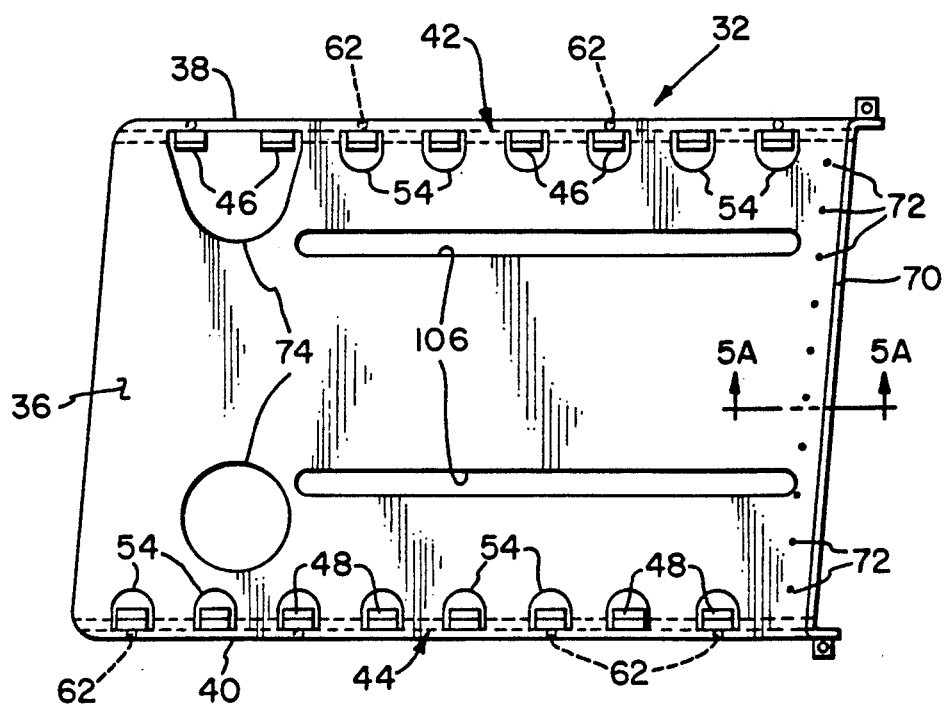
FIG. 5 is an enlarged front elevational view of the extender channel of the sunshade assembly of FIG. 1.

Referring to FIG. 5, channel member 32 is a molded plastic piece including a flat body portion 36 having a top edge 38 and a bottom edge 40. Top and bottom edges 38 and 40 include respective top and bottom tracks 42 and 44 between which extender blade 34 is slidingly retained. A plurality of upper fingers 46 and a plurality of lower fingers 48 are spaced along and connected to top and bottom edges 38 and 40, respectively, so as to extend inwardly and, with body portion 36, define top and bottom tracks 42 and 44. Tracks 42 and 44 will now be described, with specific reference made to bottom track 44; however, this description is equally applicable to top track 42.

Figure 7:
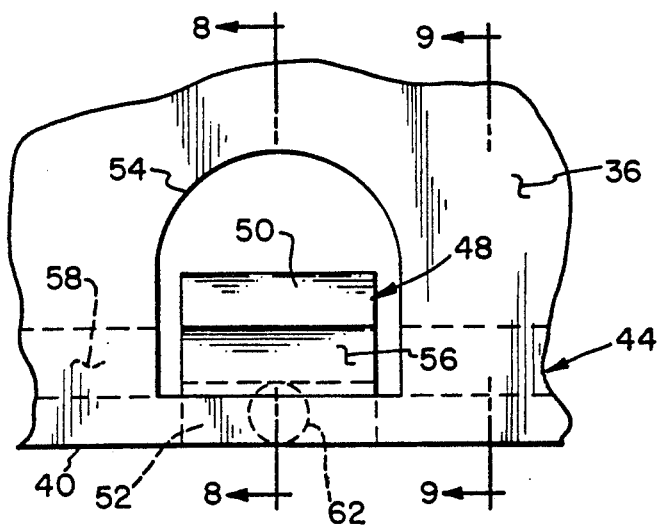
FIG. 7 is an enlarged fragmentary view of the extender channel of FIG. 5, particularly showing a portion including one of the blade-retaining finger members.
Figure 8:
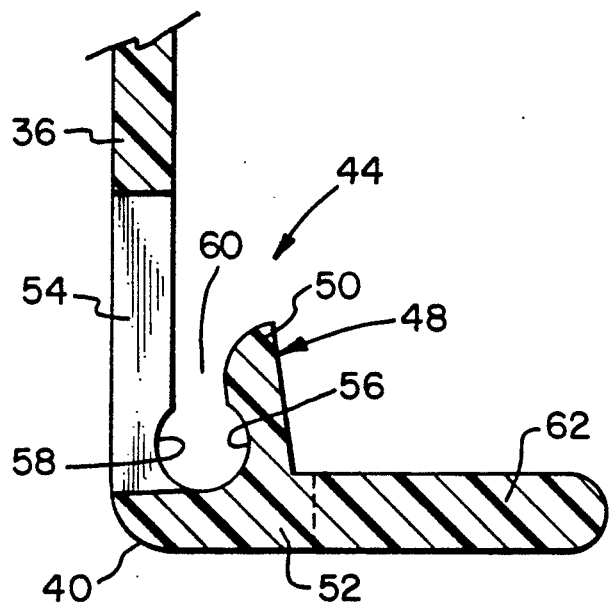
FIG. 8 is a fragmentary sectional view of the extender channel of FIG. 5, taken along the line 8—8 in FIG. 7 and viewed in the direction of the arrows, particularly showing the finger member in its naturally inwardly biased condition without the extender blade engaged therewith.
Figure 9:
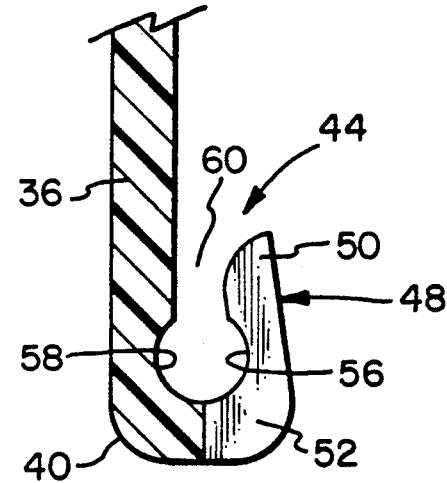
FIG. 9 is a fragmentary sectional view of the extender channel of FIG. 5, taken along the line 9—9 in FIG. 7 and viewed in the direction of the arrows.

Referring to FIGS. 7-9, lower fingers 48 of bottom track 44 include an unattached end 50 and an attached end 52. Attached end 52 is integrally connected to body portion 36 at bottom edge 40 such that unattached end 50 extends upwardly in generally parallel, spaced relationship to body portion 36. Associated with each finger 48 is a respective access opening 54 in body portion 36 of channel member 32. As shown in FIGS. 7 and 8, access opening 54 provides access to finger 48 from the opposite side of body portion 36, for the purpose of easily molding channel member 32.

Each finger 48 includes an axially extending semi-cylindrical groove 56, which faces oppositely a corresponding semi-cylindrical groove 58 formed in body portion 36. Due to access openings 54, grooves 56 and 58 are staggered axially from a finger 48, to body portion 36, to another finger 48, and so on. Therefore, as viewed in the axial direction (FIGS. 8 and 9), bottom track 44 exhibits a circular cross-section having a narrow top opening 60.

Figure 4:
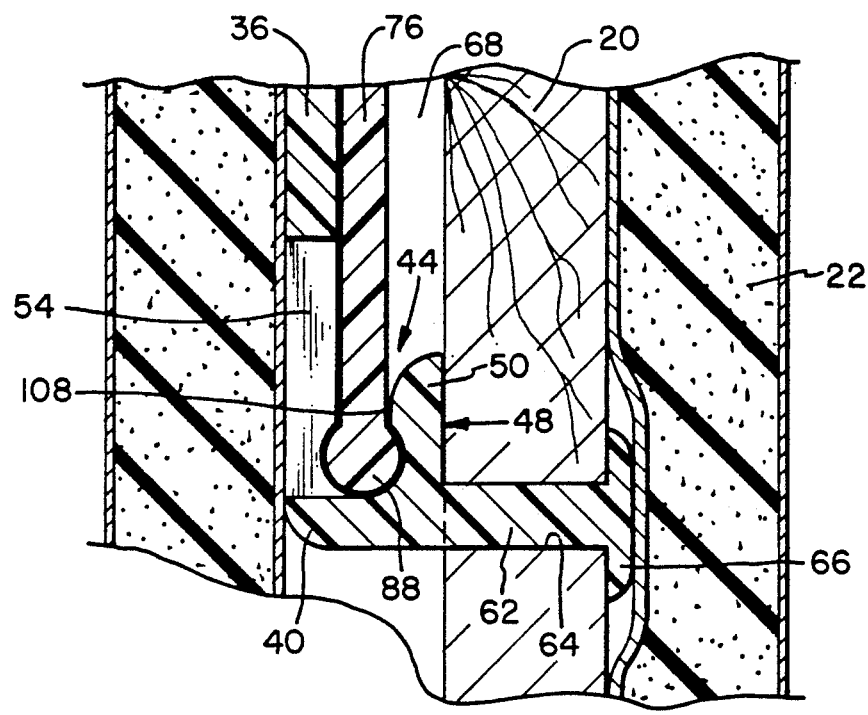
FIG. 4 is an enlarged fragmentary sectional view of the sunshade assembly of FIG. 1, taken along the line 4—4 in FIG. 2 and viewed in the direction of the arrows, particularly showing attachment of the extender channel to the core board and retention of the extender within the extender channel.

As previously noted, channel member 32 is mounted to core board 20. This is accomplished by a plurality of plastic mounting posts 62 that are integrally formed with channel member 32 and extend from the attached end of selected fingers. In the case of those bottom fingers having mounting posts, a post 62 extends from attached end 52, as shown in FIG. 8. Referring to FIG. 4, each mounting post 62 extends through a corresponding hole 64 in core board 20 and is heat staked, or heat welded, to form a heat stake head 66 having greater diameter than hole 64. In this arrangement, upper and lower fingers 46 and 48 lie adjacent core board 20, thereby spacing body portion 36 away from core board 20 and creating a channel chamber 68 therebetween in which extender blade is received.

Figure 5A:
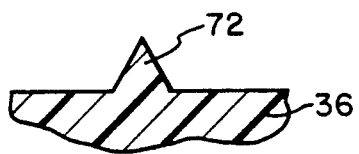
FIG. 5A is an enlarged fragmentary sectional view of the extender channel of FIG. 5, taken along the line 5A—5A in FIG. 5 and viewed in the direction of the arrows.
Figure 6A:
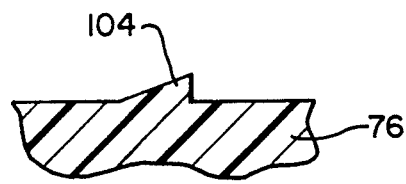
FIG. 6A is an enlarged fragmentary sectional view of the extender blade of FIG. 6, taken along the line 6A—6A in FIG. 6 and viewed in the direction of the arrows.

Referring once again to FIG. 5, channel member 32 includes a raised flange 70 that is exposed through opening 30 to act as a decorative trim piece. The edge of access opening 30 comes up to flange 70 and is attached to channel member 32 by a suitable adhesive, with the aid of a plurality of raised spikes 72 on body portion 36, as illustrated in FIG. 5A. Channel member 32 also includes several apertures 74 through which access is gained to core board 20 after channel member 32 is attached thereto. For instance, a lighted vanity assembly (not shown) may be mounted on the other side of sunshade assembly 10 by heat staking mounting posts associated therewith by access through apertures 74.

Figure 6:
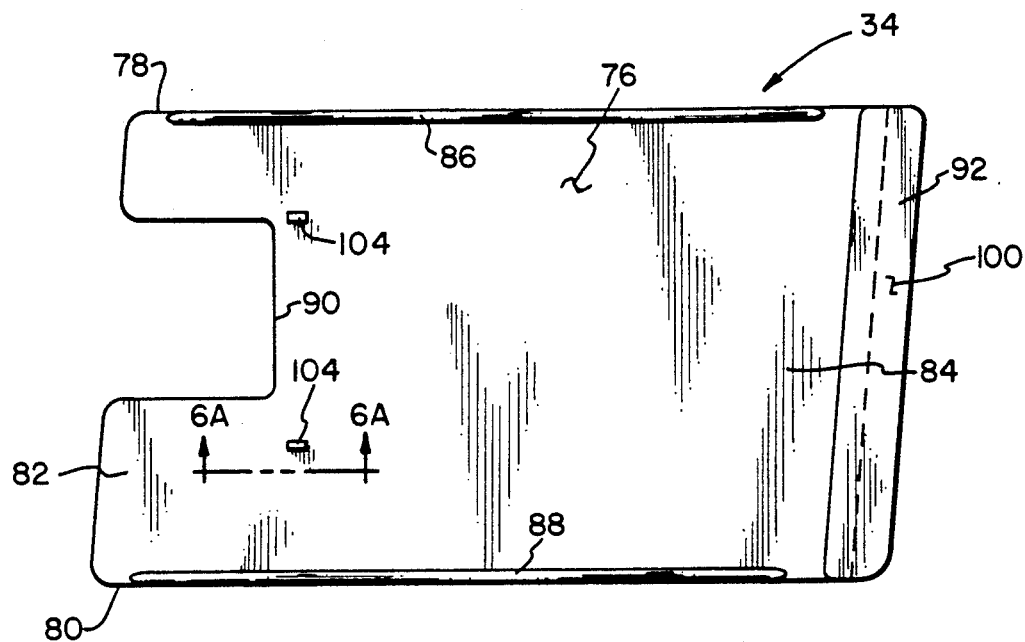
FIG. 6 is an enlarged front elevational view of the extender blade of the sunshade assembly of FIG. 1, with the blade oriented as it would be received into the extender channel of FIG. 5.

Referring to FIG. 6, extender blade 34 is a rectangular-shaped, molded plastic piece, including a flat body portion 76 having a top edge 78, a bottom edge 80, a captured end 82, and a free end 84. Extending axially along top and bottom edges 78 and 80 are respective beads 86 and 88 having circular cross-section so as to fit within previously described top and bottom tracks 42 and 44, respectively. In the disclosed embodiment, captured end 82 includes a notch 90 which, when retracted within channel member 32, provides clearance space around vanity bulbs (not shown).

Extender blade 34 is provided with a U-shaped handle 92 extending the width of free end 84. As best illustrated in FIG. 3, U-shaped handle 42 defines a channel that opens inwardly toward opposite captured end 82 of extender blade 34. More specifically, handle 92 comprises a first channel wall 94, a second channel wall 96, and a channel bottom 98. Channel walls 94 and 96 include respective indentations 100 and 102 on their outwardly facing surfaces. These indentations not only provide a handle appearance, but function to receive an operator's thumb and forefingers to facilitate grasping of the handle.

Extender blade 34 includes a pair of triangular-shaped protrusions 104 on the surface of body portion 76 that is adjacent body portion 36 of extender channel 32 when blade 34 is received therein. Protrusions 104 are shaped to allow extender blade 34 to enter channel member 32, whereupon protrusions 104 ride freely within corresponding slots 106 in body portion 36 of channel member 32. When blade 34 is fully extended (FIG. 2), protrusions 104 catch on the ends of slots 106, thereby preventing blade 34 from becoming disengaged from channel member 32.

In operation, extender assembly 12 may be selectively positioned by an operator in any desired position between and including the fully retracted position of FIG. 1 and the fully extended position of FIG. 2. In the fully retracted position, peripheral edge portion 26 of covering 22 is received within the channel defined by U-shaped handle 92.

In the preferred embodiment, peripheral edge portion 26 is thicker than the channel width between channel walls 94 and 96, so that the edge portion is frictionally received or "pinched" by U-shaped handle 92, as shown in FIG. 3. This occurs because peripheral edge portion 26 is compressible and/or channel wall 96 is deformable outwardly upon introduction of the edge portion within the channel.

A primary feature of the present invention is the aforementioned arrangement, whereby handle 92 wraps around peripheral edge portion 26 in the retracted position of extender assembly 12 and, therefore, is visible from both sides of sunshade body 14. In this manner also, extender blade 34 appears to slide in and out of the peripheral edge of sunshade body 14, thereby giving it a unique appearance within the industry.

In another aspect of the present invention, a desirable amount of friction between the channel member and the extender blade is created by virtue of the design of the channel member. Specifically, the plurality of fingers are formed such that they extend inwardly. Upon introduction of the blade into the channel, the fingers become resiliently biased against the blade member.

Referring once again to FIGS. 4, 8, and 9, extender blade 34 is frictionally slidingly retained within extender channel 32, by virtue of a frictional interface 108 between unattached ends 50 of fingers 48 and body portion 76 of the blade. As shown in FIGS. 8 and 9, fingers 48 are molded so as to be normally biased inwardly toward body portion 36 in the absence of blade 34. Upon introduction of the blade member into the channel, fingers 48 are resiliently biased against body portion 76 to create friction therebetween. In the disclosed embodiment wherein fingers 46 and 48 extend along the entire length of top and bottom edges 38 and 40, captured end 82 of extender blade 34 alternatingly encounters top and bottom fingers as it is retracted into channel member 32. This tends to increase friction linearly over the traveled distance. It is also contemplated to provide fingers on the top and bottom edges that are always engaged with the extender blade, i.e. near the open end of the channel member so as to be engaged with the blade when fully extended, thereby providing a constant friction when the blade is retracted.

In the method of assembling sunshade assembly 10, in accordance with the present invention, extender channel member 34 is mounted to one side of core board 20 by first providing holes 64 in the core board, placing channel member 34 adjacent the core board with mounting posts 62 extending through holes 64, and then heat staking or welding the post ends on the other side of the core board. Covering 22 is then applied to the core board and channel member assembly. Specifically, the covering material is folded over the core board and is sewn together circumjacent periphery 28 of the core board to form a double-layered peripheral edge portion 26. Access opening 30 in covering 22 is aligned with raised flange 70 of channel member 34, whereby extender blade 32 may then be inserted into the channel member.

It will be appreciated that the self-contained extender assembly 12 may easily be added as an option to a sunshade assembly having a design including an inner core board and outer covering. Furthermore, a lighted vanity assembly may be added to the opposite side of the core board after installation of the extender assembly. This provides flexibility in manufacturing without requiring different basic fabrication equipment. Also, fabrication of the channel member of the present invention, wherein a plurality of fingers define the channel, can be easily accomplished with a single draw molding process, i.e., without the use of die slides or inserts.

It will be appreciated that the foregoing description of a preferred embodiment of the invention is presented by way of illustration only and not by way of any limitation, and that various alternatives and modifications may be made to the illustrated embodiment without departing from the spirit and scope of the invention.

What is claimed is:

1. A sunshade assembly including a retractable extender for selectively providing increased coverage area, comprising:
    a sunshade body including a first side, a second side, and a peripheral edge;
    an extender blade;
    channel means within said sunshade body and communicating with an access opening on one of said first and said second sides, for slidingly receiving said extender blade through said access opening between a retracted position substantially within said sunshade body and an extended position in which the extender blade extends outwardly beyond the peripheral edge of said sunshade body; and
    handle means on said extender blade for enabling an operator to selectively move said extender blade between said retracted position and said extended position, said handle means being wrapped around a portion of the peripheral edge of said sunshade body when said extender blade is in said retracted position such that said handle means covers a portion of the other of said first and second sides adjacent the peripheral edge, whereby said handle means is visible and readily accessible by the operator from both sides of said visor body.

2. The sunshade assembly of claim 1 in which:
    said extender blade includes a captured end received within said channel means and an opposite free end out of engagement with said channel means; and
    said handle means comprises a U-shaped handle on said free end of said extender blade, said U-shaped handle defining a channel that opens toward said captured end of said extender blade and receives said portion of the peripheral edge of the sunshade body when said extender blade is in said retracted position.

3. The sunshade assembly of claim 2 in which:
    said portion of the peripheral edge of the sunshade body that is received within said channel defined by said U-shaped handle is frictionally received therein.

4. The sunshade assembly of claim 2 in which:
    said U-shaped handle includes a first channel wall substantially coplanar with said extender blade, a second channel wall spaced from and substantially parallel to said first channel wall, and a channel bottom substantially perpendicular to and interconnecting said first and second channel walls, said first channel wall being visible from said one of said first and second sides of said sunshade body and said second channel wall being visible from the other one of said first and second sides when said extender blade is in said retracted position.

5. The sunshade assembly of claim 4 in which:
    said second channel wall of said U-shaped handle is deformable outwardly upon introduction of said portion of said peripheral edge of the sunshade into said channel defined by said U-shaped handle, thereby resulting in frictional engagement.

6. The sunshade assembly of claim 4, in which:
    outwardly facing surfaces of said first channel and said second channel wall include respective indentations to facilitate grasping of said U-shaped handle by the thumb and forefinger of an operator.

7. A sunshade assembly including a retractable extender for selectively providing increased coverage area, comprising:
    a generally planar inner core board having opposite sides and a periphery;
    a separate extender channel member mounted adjacent one of said opposite sides of said inner core board;
    an extender blade slidingly received within said extender channel member, said extender blade including a handle portion; and
    outer covering means for covering said inner core board and said extender channel member, said outer covering means including an outer peripheral edge circumjacent said periphery of said inner core board, and an access opening through which said extender blade extends, said handle portion of said extender blade being adapted to wrap around a portion of said outer peripheral edge of said outer covering means.

8. The sunshade assembly of claim 7, in which:
    said extender blade includes a captured end received within said channel member and an opposite free end out of engagement with said channel member, said handle portion being on said free end and being U-shaped to define a channel that opens toward said captured end of said extender blade and receives said portion of said outer peripheral edge of said covering means.

9. The sunshade assembly of claim 7, in which:
    said channel member is attached to said inner core board by attachment means comprising a plurality of holes in said inner core board and a corresponding plurality of post members integrally formed with said channel member, each said post member originating on said one opposite side of said core board, extending through a corresponding said hole, and terminating as an enlarged head portion adjacent the other opposite side.

10. The sunshade assembly of claim 9, in which:
said channel member comprises plastic material and each said enlarged head portion comprises a heat stake.

11. In a sunshade assembly including a generally planar inner core board having a first side, a second side, and a periphery, and an outer covering for the core board having a peripheral edge circumjacent the periphery of the inner core board, an extender assembly comprising:
a channel member mounted adjacent one of the first and second sides of the core board and intermediate the core board and the outer covering;
a blade member slidingly received within said channel member, said blade member including a captured end received within said channel member and an opposite free end being out of engagement with said channel member; and
an access opening in the outer covering of the sunshade assembly through which said free end of said blade member extends.

12. The extender assembly of claim 11 in which:
said free end of said blade member includes a U-shaped handle portion to enable an operator to selectively move said blade member between a retracted position substantially within said channel member and an extended position in which a selected portion of said blade member extends out of said channel member, said U-shaped handle portion being adapted to wrap around a portion of the peripheral edge of the covering when said blade member is in said retracted position.

13. The extender assembly of claim 11, in which:
said channel member comprises a flat body portion having an upper edge and a lower edge, an upper track along said upper edge, and a lower track along said lower edge, said blade member being slidingly retained between said upper track and said lower track on one side of said body portion.

14. The extender assembly of claim 13, in which:
said upper track and said lower track are each partially defined by said body member and an upper plurality of fingers and a lower plurality of fingers, respectively, each of said upper and lower plurality of fingers having an attached end connected to said respective upper and lower edges, and an unattached end extending inwardly from said respective upper and lower edges in spaced relationship to said body portion, such that said blade member is slidingly retained between said upper track and said lower track intermediate said body portion and said upper plurality of fingers and said lower plurality of fingers, respectively.

15. The extender assembly of claim 14, in which:
said body portion includes a plurality of access openings corresponding to each said finger of said upper plurality of fingers and said lower plurality of fingers, each said access opening being located opposite a respective said finger such that access to said upper plurality of fingers and said lower plurality of fingers for the purpose of molding same is possible from the side of said body portion that is opposite said fingers.

16. The extender assembly of claim 14, in which:
said unattached ends of said upper plurality of fingers and said lower plurality of fingers are normally biased inwardly toward said body portion in the absence of said blade member intermediate said fingers and said body member such that upon introduction of said blade member intermediate said fingers and said body portion said fingers are resiliently biased against said blade member, whereby said blade member is frictionally slidingly retained.

17. The extender assembly of claim 13, in which:
said blade member includes at least one protrusion on the surface of said blade member that is adjacent said flat body portion of said channel member when said blade member is operatively engaged with said channel member, and said channel member includes at least one corresponding slot opening in said flat body portion into which said protrusion is received, said blade member being limited in sliding movement relative to said channel member by abutment of said protrusion with slot walls defining said slot opening.

18. A method of manufacturing a sunshade assembly having an extender that is selectively movable between a retracted position and an extended position to provide increased coverage area, comprising the steps of:
providing a generally planar inner core board having a first side, a second side, and a periphery;
providing an extender assembly including a channel member and an extender blade slidingly received within said channel member, said extender blade including a captured end received within said channel member and an opposite free end being out of engagement with said channel member, said free end including a handle portion to enable an operator to selectively move said extender blade between said retracted position and said extended position of the extender;
mounting said channel member to one of said first and second sides of said inner core board; and
covering said inner core board and said extender assembly with a covering material having an access opening through which said free end of said extender blade extends.

19. The method of manufacturing a sunshade assembly of claim 18, in which:
said handle portion of said free end of said extender blade is U-shaped; and
said step of covering said inner core board and said extender assembly is performed such that the covering material forms a peripheral edge circumjacent said periphery of said inner core board, and said U-shaped handle portion wraps around a portion of said peripheral edge when said extender blade is in said retracted position of the extender.

20. The method of manufacturing a sunshade assembly of claim 18, in which:
said inner core board includes a plurality of holes and said channel member includes a corresponding plurality of post members integrally formed therewith; and
said step of mounting said channel member to one of said first and second sides of said inner core board is performed by placing said channel member adjacent said one side such that said plurality of post members extend through said corresponding plurality of holes to the other side of said core board, and then heat staking said plurality of post members on said other side of said core board so that said plurality of post members terminate in respective heat stakes having greater diameter than their respective holes, whereby said channel member is mounted to said inner core board.

* * * * *